Jan. 11, 1938.       J. C. MORROW       2,104,903
LUBRICATOR VALVE CONSTRUCTION
Filed March 27, 1936
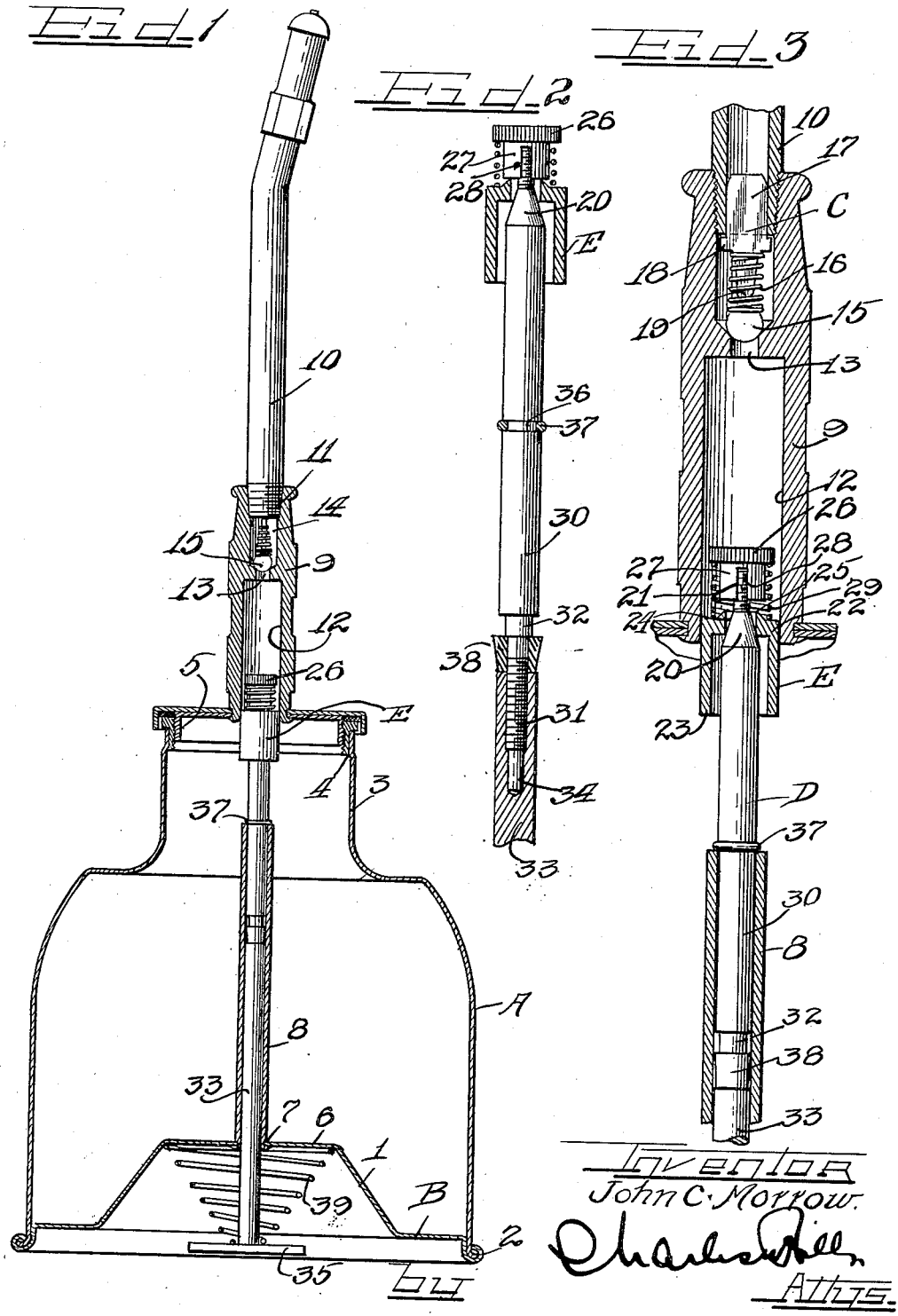

Patented Jan. 11, 1938

2,104,903

UNITED STATES PATENT OFFICE 2,104,903

LUBRICATOR VALVE CONSTRUCTION

John C. Morrow, Chicago, Ill., assignor to Morrow Lubricator Company, Chicago, Ill., a corporation of Illinois Application March 27, 1936, Serial No. 71,093

4 Claims. (Cl. 221—51)

The present invention relates to lubricator valve construction and more particularly to the construction of a plunger rod for use with high pressure lubricators.

In high pressure oil lubricators, in use at the present time, oil is discharged under high pressure by means of a piston and plunger arrangement operable through the lubricator body, by means of thumb pressure applied to the plunger rod.

In order to effectively seal the body of the lubricator from escape of oil along the plunger rod, the present invention has been devised.

An object of the present invention is to provide a plunger rod construction for high pressure lubricators wherein oil escape along the plunger rod is prevented.

Another object of the present invention is to provide a plunger rod construction for lubricators wherein oil escape along the rod is prevented and wherein the construction of the rod is such as to lend itself to economical manufacture and low cost of assembly.

Generally speaking the invention contemplates the manufacture of a plunger rod in a plurality of parts, which are threaded together and with a washer between two of the threaded parts which is compressed when the parts are threaded together to effectively seal oil escape along the rod.

The above, other and further objects of the present invention will be readily understood from the following description and appended drawing.

The accompanying drawing illustrates an embodiment of the present invention and the views thereof are as follows:

Fig. 1 is a view in axial section through a lubricator for high pressure oil lubrication showing certain parts in elevation and certain parts in section.

Fig. 2 is a view showing in elevation the plunger rod of the present invention and in section one of the parts of the rod in connected relation to the first part, as well as the piston valve member of the lubricator.

Fig. 3 is an enlarged axial sectional view through a portion of the spout structure showing a portion of the plunger rod in elevation, a portion of the guide sleeve in section, the piston valve in section, the end nut elevation, and other parts in section and elevation.

The drawing will now be explained:

The body A, in the illustrated form of lubricator, may be drawn, spun or otherwise fashioned from flat metal, with a bottom B having a central indented portion 1 and its margin 2 spun over the lower edge of the body to unite the body and bottom in leak tight relationship. The upper end of the body is reduced in diameter to provide a neck 3, the upper end of which is provided with a threaded ring 4 to receive the threaded male member 5 of the spout.

The bottom B, by reason of its indentation 1, has an inwardly disposed substantially horizontal or flat part 6 which is apertured at 7 to receive a guide, such as the sleeve 8. The sleeve is secured in the aperture 7 by swedging or otherwise and extends upwardly within the interior of the body A.

The spout includes a part 9, preferably of cast or forged metal and a part 10 of tubular form which is threaded at 11 into the upper end of the part 9. The part 9 is fashioned with an interior cylindrical chamber 12, a restricted passageway 13 at the upper end of the chamber 12 and another chamber 14 above the restricted passageway. The restricted passageway 13 is normally closed by means of a check valve comprising a ball 15 urged against its seat in the margin of the opening by means of a spring 16. The spring 16 for the check valve 15 is secured in place by means of a flat cross shaped piece of metal C. Piece C has a part 17 adapted to be wedged into the adjacent extremity of the part 10 of the spout, outwardly extending lugs 18 which engage against the end of the portion 10 of the spout to limit the penetration of the part 17 into the part 10, and a tapered finger 19 projects downwardly and into the spring 16, the spring 16 being engaged with the finger 19 to prevent ordinary disconnection of the parts. For discharging oil under high pressure, through the spout 10, piston means are employed.

In the present instance, a plunger rod D has a conically tapered portion 20 near its end adjacent the chamber 12. Projecting from the apex of the tapered portion is an extension 21 which is threaded at its extremity. Loosely supported on the tapered portion 20 of the rod is a cup shaped piston valve member E comprising a head 22 and a skirt 23. The head 22 is centrally apertured at 24 for passage of oil through the valve member and also to form a margin for seating against the conical portion 20 of the rod. Preferably the outer margin of the aperture 24 is formed with a sharp shoulder 25. The diameter of the aperture 24 is such that the inner margin of the head rests somewhere on the tapered portion 20 of the rod and thus is movable relatively to the rod.

For retaining the piston member E on the rod D, a skirted nut is threaded onto the extension 21 of the rod. The nut has a knurled head 26 and a skirt 27 which is slotted as at 28 for a purpose to be later explained.

When the piston member E is assembled on the rod D, a spring 29 is applied to the skirt 27 of the nut, when the nut is applied to the threaded extension 21, which spring thereby serves to retain the piston valve member E seated against the conically tapered portion 20 of the rod.

The rod D, of the present invention, is constructed of a plurality of parts, two such being here shown.

One part of the rod D comprises a section 30 which at one end has a portion of reduced diameter 31 which is threaded. Between the reduced portion 31 and the rod portion 30 a shoulder 32 is formed.

The other part of the rod consists of a part 33 which has a threaded counterbore 34 in it for connection to the part 30. The extremity of the portion 33 is provided with a button 35 welded or otherwise secured to the rod.

The part 30 of the rod is formed with an annular recess 36 in which a ring 37 is retained.

In assembling the parts 33 and 30 to constitute the rod D, a washer 38 preferably of frustoconical form is applied over the threaded extension 31 of the part 30 and against the shoulder 32. Thus when the parts 33 and 30 are screwed together the washer will be compressed axially.

The relative lengths of the parts 30 and 33 are such that when assembled and inserted in the sleeve 8 the washer 38 will be within the sleeve and thus effectively seal the sleeve against escape of oil through the bottom of the body. The ring 37 engages the extremity of the sleeve or guide 8, at the end thereof adjacent the spout, to limit the retracted position of the rod.

Surrounding the rod 33, where its portions project outwardly of the body, is a spring 39 whose function is to urge the rod and its connected parts to retracted position, which is the position determined by engagement of the ring 37 with the extremity of the sleeve 8, as may be observed in Fig. 1, and also in Fig. 3.

The diameter of the chamber 12 of the spout part 9 and of the piston valve member E is such as to cause slight friction therebetween when the piston is reciprocated. Furthermore, the provision of the check valve 15 normally closes the chamber 12 to the atmosphere and thus when the rod D is retracted after a discharge stroke, suction is created within the chamber 12, which, together with the frictional engagement of the piston member E with the wall of the chamber 12, causes the piston member E to leave its seat and move against the skirt 27 of the nut. This action unseats the piston member with respect to its conical seat 20 and permits passage of oil from the interior of the body into the chamber 12 of the spout. When the rod D reaches its retracted position as limited by the ring 37, the spring 29 becomes effective to seat the piston valve member E against its seat and thus retain the charge of oil within the chamber 12.

In assembling the parts 30 and 33 of the plunger rod D, the part 30 is inserted through the upper end of the sleeve 8, that is, within the interior of the body A, while the part 33 is inserted through the bottom B of the body from its exterior, and the parts threaded together within the sleeve 8.

The oil is discharged by trapping a charge in the chamber 12, which is done by lowering the spout and pushing the plunger inwardly and releasing pressure against the button 35. Because of the suction within the chamber 12 and of the fit between the piston member E and the wall of the chamber, the piston member is unseated and moved against the skirt of the nut whereupon oil enters through the interior of the piston member E through its aperture 24, through the slots 28 of the nut skirt and into the chamber 12. After the rod has reached its retracted position, the spring 29 eventually seats the piston valve E against the tapered portion 20 of the rod. The charge within the chamber is discharged by thumb pressure applied against the button and the plunger moves into the chamber creating sufficient pressure to open the check valve 15 against its seat thereby allowing the oil to escape through the tip of the spout.

The formation of the washer 38 in the form of a truncated cone results in several advantages. When the plunger rod D is advanced to discharge oil through the spout, any oil against the washer will force its margin of greater diameter against the sleeve wall and thus prevent oil leakage past the washer. When rod is retracted on back stroke, air entering the sleeve will pass the washer as it deflects the margin of greater diameter away from the sleeve wall.

The manner of mounting the check valve ball 15 is novel. By using thin metal for the supporting piece C, oil passes it without having to pass through the spring 16. The provision of the finger 19 limits the distance the ball 15 is unseated when oil is discharged. Furthermore, the check valve may be readily removed for cleaning and repair.

The invention has been described herein more or less precisely as to details, yet it is to be understood that the invention is not to be limited thereby, as changes may be made in arrangement and proportion of parts, and equivalents may be substituted, without departing from the spirit and scope of the invention.

The invention is claimed as follows:

1. In a plunger type lubricator, a lubricator body having a discharge outlet, a tubular guide in axial alignment with said outlet and having its adjacent end disposed in spaced relation with respect to said outlet, a valve normally closing said outlet, a plunger rod movable within said guide and carrying said valve, a washer in the form of a truncated cone on said rod and working within said guide and disposed on the rod with its face of greater diameter directed toward the lubricator outlet so as to increase the sealing effect between the washer and guide as the rod is moved in a direction to discharge lubricants through said outlet.

2. In a plunger type lubricator, a lubricator body having a discharge outlet, a tubular guide in axial alignment with said outlet and having its adjacent end disposed in spaced relation with respect to said outlet, a valve normally closing said outlet, a plunger rod movable within said guide and carrying said valve, a washer in the form of a truncated cone on said rod and working within said guide and disposed on the rod with its face of greater diameter directed toward the lubricator outlet so as to increase the sealing effect between the washer and guide as the rod is moved in a direction to discharge lubricants through said outlet, the disposition of the washer with its face of greater diameter toward said outlet permitting slight deflection of the washer margin adjacent the face of greater diameter on return strokes to admit air to the interior of the lubricator body.

3. In a plunger type lubricator, means providing an oil trapping chamber, a check valve closing said chamber at one end and a plunger rod piston valve closing the other end, said piston valve being shiftable on said rod to admit lubricant to said chamber through the interior of said piston valve when the rod and valve are moved on return stroke away from said check valve, a spring acting against said rod to normally maintain it in retracted position and maximum spaced relation with respect to the check valve, spring means effective to normally maintain said piston valve on said rod in position to close its interior to oil passage, said piston valve snugly fitting said chamber so as to be shifted on said rod to open its interior to lubricant flow on return stroke, the snug fit of said piston valve creating suction within said chamber on return stroke sufficient to draw lubricant from the container into the chamber through the interior of said piston valve, means providing an oil inlet to said chamber, said inlet being so disposed with respect to said piston valve that when the same is in retracted position lubricant entry to said chamber is prevented except through the interior of said piston valve.

4. In a plunger type lubricator, a lubricator body having a discharge outlet, means providing an oil trapping chamber with said discharge outlet at one end, a plunger rod working within said chamber, said rod having a tapered portion adjacent one extremity, a hollow piston valve having a ported head at one end with said ported head receiving the tapered portion of said rod, spring means normally urging said head against said tapered portion as a seat to close passageway through said piston valve, and means for varying the effectiveness of said spring in its action against said piston valve.

JOHN C. MORROW.